United States Patent [19]

Hargreaves et al.

[11] 4,220,066
[45] Sep. 2, 1980

[54] APPARATUS FOR CUTTING OR SCORING SHEET MATERIAL

[75] Inventors: Brian Hargreaves, Warrington; Angus D. Duncan, Ashton-in-Makerfield, both of England

[73] Assignee: Pilkington Brothers Limited, St. Helens, England

[21] Appl. No.: 930,069

[22] Filed: Aug. 2, 1978

[30] Foreign Application Priority Data

Aug. 10, 1977 [GB] United Kingdom ............... 33622/77

[51] Int. Cl.³ .............................................. B26D 3/08
[52] U.S. Cl. ......................................... 83/886; 83/582
[58] Field of Search ................................. 83/879–887, 83/582, 506; 225/96, 96.5; 33/32 C, 32 D, 32 E, 32 F

[56] References Cited

U.S. PATENT DOCUMENTS

| 2,556,757 | 6/1951 | Guild | 33/32 D |
| 3,108,380 | 10/1963 | Arnaud | 33/32 E |
| 3,577,636 | 5/1971 | Detorre | 83/886 X |
| 3,742,793 | 7/1973 | Gray | 83/881 |
| 4,027,562 | 6/1977 | Bonaddio | 33/32 C |

Primary Examiner—J. M. Meister
Attorney, Agent, or Firm—Burns, Doane, Swecker & Mathis

[57] ABSTRACT

Glass scoring apparatus comprises a cutting tool, means for applying a cutting load to the cutting tool when the tool engages a glass surface to be scored, and a damping member arranged to absorb energy developed by reaction forces opposing the cutting load when the tool is moved into contact with the glass. The damping member has a loss factor tan δ which is high enough to prevent any substantial transient reduction in the cutting load.

12 Claims, 5 Drawing Figures

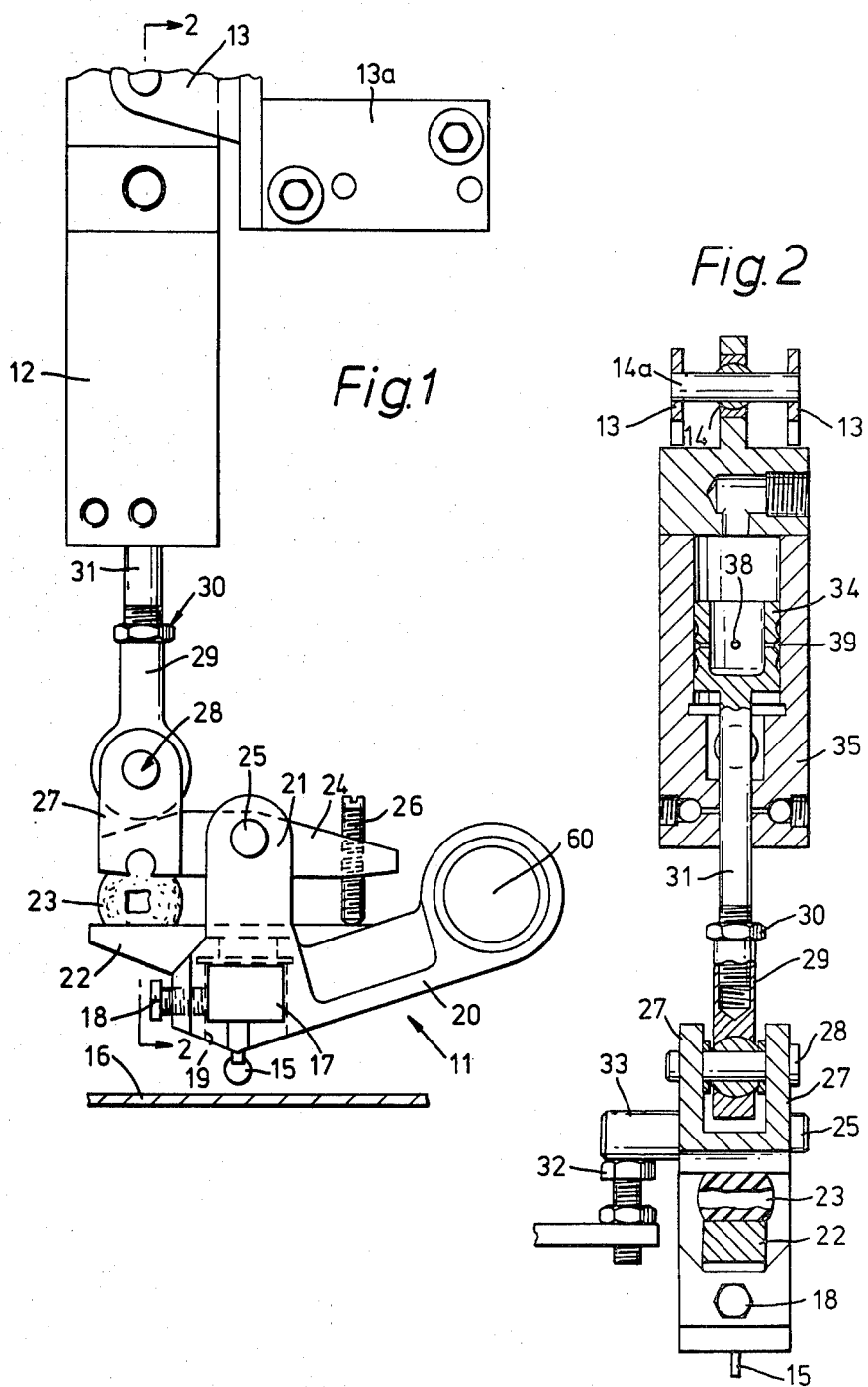

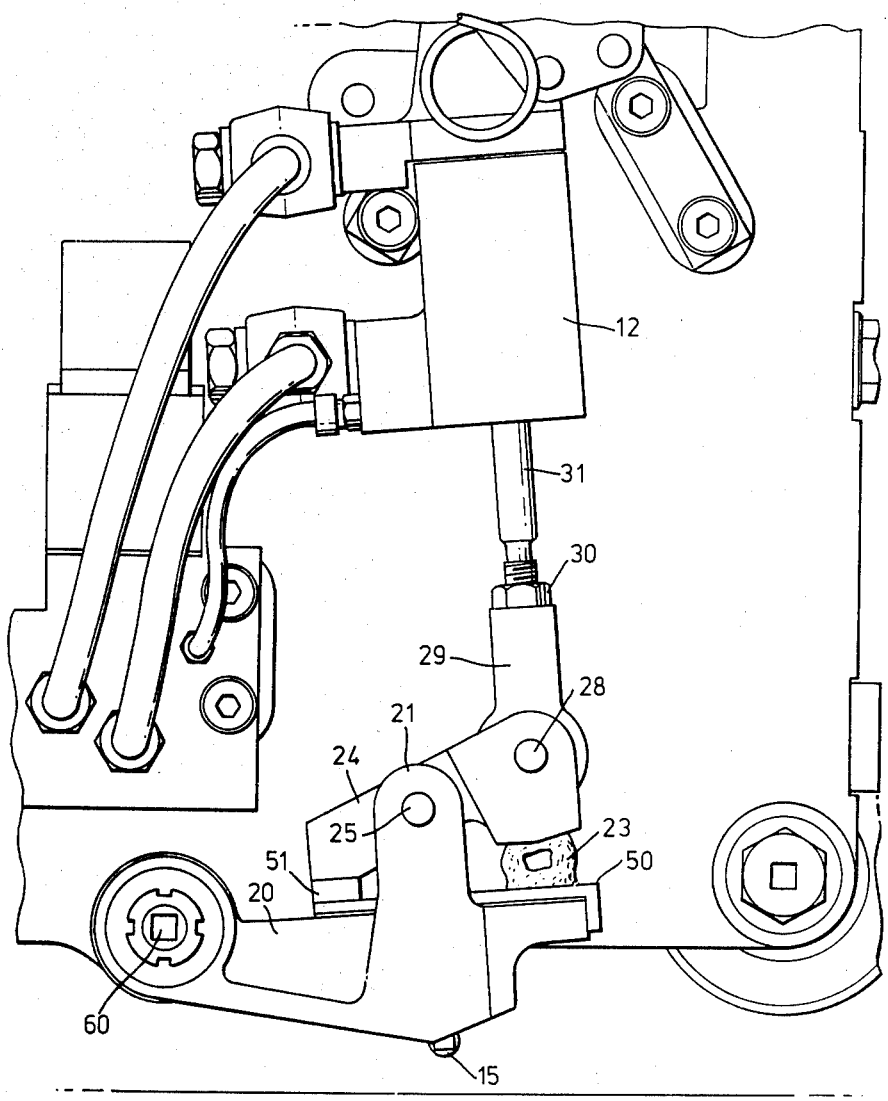

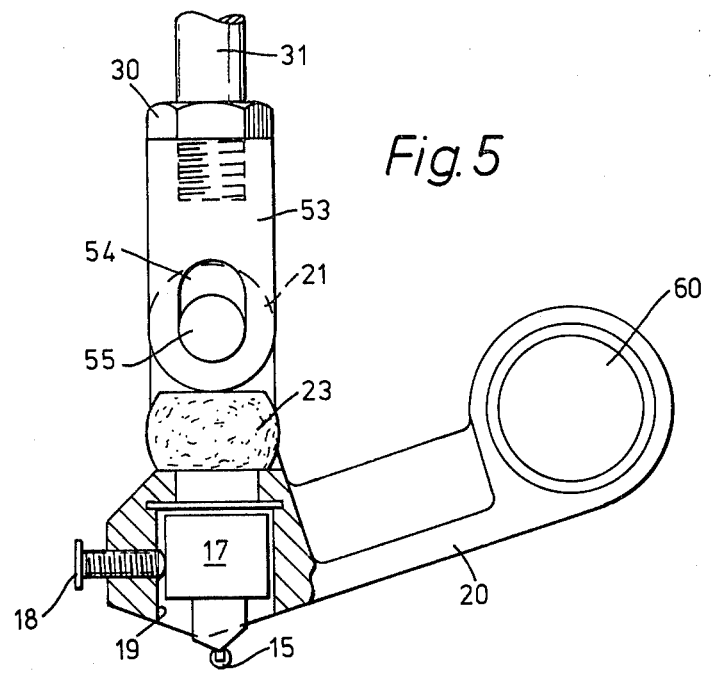

APPARATUS FOR CUTTING OR SCORING SHEET MATERIAL

BACKGROUND OF THE INVENTION

The invention relates to apparatus for scoring sheet material, e.g. glass sheets or continuous glass ribbons, prior to breaking the sheet along the score line or lines.

It is known, for the purposes of cutting or scoring a ribbon or sheet of glass, to use a cutter assembly carrying a cutting tool such as a wheel, the cutter assembly being attached to a mechanism for moving the cutter assembly towards and away from the glass to be cut. A previously proposed arrangement is described in our British Patent Specification No. 1323097 and the arrangement described in that specification includes a double acting pneumatic cylinder and piston, the piston rod being connected to the cutter assembly and arranged to move the cutter assembly towards or away from the glass.

When cutting speeds of 2 meters per second or less are employed known cutter assemblies and their operating mechanisms can be used to produce good results. However, difficulties can arise when cutting speeds are increased substantially above 2 meters per second. One of the difficulties encountered is that of keeping the cutting tool in contact with the glass surface. When increased cutting speeds, it is necessary to bring the cutting tool into contact with the glass with greater speed and this involves greater forces being applied to the cutting tool when moving it into contact with the glass. When the cutting tool engages the glass a reaction force is applied to the cutting tool by the glass tending to cause the tool to rebound from the glass after impact. This is particularly the case when scoring sheets of glass with a cutting wheel where substantial force is required. The force urging the wheel into contact with the glass sheet is known as the cutting load. When moving the tool into engagement with the glass surface, the reaction force from the glass and its means of support can substantially reduce the cutting load so that the tool moves out of contact with the glass surface. Alternatively, the reaction force may not be sufficient to move the tool out of contact but it may nevertheless severly reduce the cutting load so that an ineffective score is produced. In either case, a poor or unacceptable edge can be produced when the glass is eventually snapped to form a break along the score line. The effect of varying score quality along the cutting line can produce an effect known as "stitching".

The greater the cutting speed, the greater this problem can be. It is also found that when using cutting speeds in excess of 2 meters per second, any delay in response of the cutter mechanism to changes in the glass surface contour can cause problems in not permitting the cutting wheel to follow accurately the variation in glass surface contours. This delay is mainly created by friction in the mechanism used to move the cutting tool towards or away from the glass surface.

SUMMARY OF THE INVENTION

The present invention provides glass scoring apparatus comprising a cutter assembly for carrying a cutting tool, means connected to the cutter assembly for transmitting a cutting load to the cutter assembly, and a damping device for absorbing part of any energy developed by reaction forces opposing the cutting load when the cutting tool is moved into contact with the glass surface, the damping device having a sufficiently high loss factor tan $\delta$ as herein defined to prevent a substantial transient reduction of the cutting load.

When a stress is applied to a damping device the stress is not instantaneously opposed by a degree of strain corresponding to that stress. The strain always lags slightly behind the stress. For example, if the stress variation is considered sinusoidal i.e. represented by a sine curve then the resulting strain can be represented by a similar sine wave with a phase difference, i.e. displaced in a positive direction on the time scale. An important consequence of the phase difference between strain and stress is that part of the energy put into the damping device during its deformation is not returned during the recovery of the damping device. To express this phenomena mathematically the effective stress acting on a damping device can be considered as made up of (i) an elastic stress component of magnitude $A_1$ which varies strictly in-phase with the strain and (ii) a viscous component of magnitude $A_2$ 90° out-of-phase with the strain. The magnitude $A_f$ of the total stress is then expressed:

$$A_f = \sqrt{(A_1^2 + A_2^2)}$$

and the damping ability of the damping device can be expressed as a loss factor tan $\delta$ which is defined as follows:

$$\tan \delta = \frac{A_2}{A_1}$$

By subjecting a damping device to sinusoidal forced oscillations of constant frequency and amplitude it is possible to obtain values of tan $\delta$ for different damping devices. All numerical values of tan $\delta$ specified in this specification will be taken as values determined by applying the test conditions set out in British Standard BS903: Part A24: 1976 operating at a temperature of 23° C. and a frequency of 200 Hertz. BS903: Part A24: 1976 is particularly applicable to damping devices consisting of a resilient material of circular or square cross-section. It will be appreciated that it may be possible to design an electromagnetic, penumatic, fluid or mechanical damping device, or combination of such damping devices which has equivalent damping characteristics, i.e. would have the same value of tan $\delta$, to that of a block of resilient material subjected to the test conditions defined above. It will be appreciated that when determining values of tan $\delta$ for such other damping devices it may not be possible to employ exactly the same test conditions set out in BS903: Part A24: 1976 because of the nature of the damping device. In such a situation the value of tan $\delta$ is determined by applying equivalent test conditions appropriate to the damping device being tested. It is to be understood therefore that the term damping device as used herein includes within its scope such equivalent damping devices as well as covering damping devices which consist solely or partly of a resilient material.

British Standard BS903; Part A24; 1976 is available from the British Standards Institution, 2 Park Street, London W1A 2BS.

This British Standard describes a method for measuring the dynamic properties of vulcanized rubber using forced sinusoidal oscillations.

For low values of tan δ (≦0.2) this method is not very precise and it is unlikely that the attainable accuracy will be better than ±0.02.

For the purposes of this British Standard the following definitions apply:

1. elastic shear modulus (in-phase modulus) G'. The component of applied shear stress which is in-phase with the shear strain, divided by the shear strain.

$$G' = \sigma_1/S$$

2. loss shear modulus (out-of-phase modulus) G''. The component of applied shear stress which is 90° out-of-phase with the shear strain, divided by the shear strain.

$$G'' = \sigma_2/S$$

3. complex modulus G*. The resultant shear stress divided by the resultant shear strain where each is a vector which may be represented by a complex number.

$$G^* = G' + iG''$$

4. absolute value of the complex modulus |G*|.

$$|G^*| = (G'^2 + G''^2)^{\frac{1}{2}} = \sigma_0/S$$

5. loss tangent (loss factor) tan δ tan $\delta = G''/G'$ where

δ is the phase angle between the sinusoidal force and deformation.

6. shear stress amplitude. The ratio of the maximum applied force, measured from the mean force, to the cross-sectional area of the unstressed test peice (zero to peak in one direction only). $\sigma_0 = F_0/2A$ for a double shear test piece.

7. shear strain amplitude (dimensionless). The ratio of the maximum deformation, measured from the mean deformation, to the free thickness of the unstrained test piece (zero to peak on one direction only).

$$S = x_0/h$$

The terms given above are strictly applicable only to a linear material, i.e., one for which the stress is proportional to the deformation. For materials containing substantial quantities of filler this is not true, and the terms cannot therefore have a precise significance. However, if the amplitude of deformation is held constant, effective values of these quantities can be measured on the understanding that their magnitude depends on the deformation amplitude.

Other terms, although not appearing in the body of the text, are frequently used in test procedures and design calculations. The more common expressions are described in Appendix A.

The deformation used shall be simple shear. This deformation has the merits that (a) a substantial proportion of manufactured articles are used in this type of strain, and (b) the stress-strain behaviour is more nearly linear than in tension or compression, especially for rubbers containing little filler. Sinusoidal forced oscillations of a constant frequency and strain amplitude shall be employed as the method of measurement. Forced oscillations, rather than resonance or free oscillation methods, are used because this ensures control of the strain amplitude, which, as discussed below, is important.

The test piece shall be of either circular or square cross section and shall be bonded to rigid end plates using a normal adhesion system.

To avoid significant bending, the diameter (or side in the case of square test pieces) shall be at least four times the thickness. This will ensure that the deformation is essentially simple shear of the calculated magnitude and that the apparent shear modulus differs by less than 3% from the true value.

No recommendation is made for absolute test piece dimensions because of the range of sensitivities of the testing machines available. However, the difficulties of ensuring uniform vulcanization in thick pieces suggests that thicknesses of more than 12 mm should be avoided.

Double shear test pieces of the general form shown in FIG. 2 are preferred as being the most convenient. The measured properties are an average for the two segments of rubber.

Any test machine whether mechanical, hydraulic or electromagnetic may be used provided the displacements and forces are adequate to give the forced oscillations of the necessary amplitudes over the required frequency range. The machine shall be such that the error in loss tangent (tan δ) of the order ±0.01 to ±5%, whichever is the greater, and the error in complex modulus (|G*|) is not more than ±2%.

NOTE: It is important that apparatus should be thoroughly checked to ensure that these accuracies are met and maintained.

For testing at elevated and sub-ambient temperatures the test piece shall be enclosed in a thermostatically controlled chamber. A gaseous heat transfer medium shall be used which is capable of maintaining the temperature anywhere in the test piece to within ±1° C. Care shall be taken to minimize heat losses from the test piece caused by conduction through metal parts connected to the outside of the chamber. The temperature in the immediate vicinity of the test piece shall be measured by a thermocouple or resistance thermometer.

The temperature of test may be chosen for the particular application in mind, but should preferably be one of the following:

| | |
|---|---|
| −55° C. | 70° C. |
| −40° C. | 100° C. |
| −25° C. | 125° C. |
| −10° C. | 150° C. |
| 0° C. | 175° C. |
| 23° C. | 200° C. |
| 55° C. | |

The actual temperature of test shall not differ from the nominal value by more than the set tolerance. This should normally be ±2° C. but may be tightened to ±0.5° C. near a transition temperature, or relaxed when high frequencies or high amplitudes are involved.

Materials containing substantial quantities of filler show viscoelastic behaviour that is dependent on the strain amplitude of test and on the strain history of the test piece. It is thus in general necessary to control these factors.

Unfilled materials do not have these complications to a significant extent.

A difficulty that can arise in testing materials of high loss angle is that heat generation in the test piece may rise the temperature significantly during the test and, as the properties of unfilled vulcanizates depend quite markedly on temperature, this introduces errors. A method of estimating the errors involved is given in Appendix B. Consideration of this factor, and the strains and frequencies met with in practical applications, have led to the recommendations that up to a frequency of 15 Hz, the strain amplitudes of test shall be ±2% and ±10%.

Observations at these two strains enable the magnitude to be determined of any strain amplitude effect that may be present. It may then be desirable to supplement the observations by tests at other strains if the application in mind demands this. For larger strains the possible temperature rise in the test piece should however be borne in mind.

Above 15 Hz the amplitudes sustained by rubber components in use very often decrease with increasing frequency, approximately as the inverse of the square of the frequency (i.e. the maximum acceleration remains approximately constant).

It is therefore recommended that the strain amplitudes applied to the test piece at frequencies above 15 Hz should be in accordance with table 1.

TABLE 1

| FREQUENCY (Hz) | STRAIN AMPLITUDE (%) |
| --- | --- |
| 15 | 2 and 10 |
| 30 | 2.5 |
| 50 | 1.0 |
| 100 | 0.25 |
| 150 | 0.10 |
| 200 | 0.06 |

The actual frequencies may be chosen for relevance to the particular application in mind, but should preferably be taken from table.

NOTE: Superposed static strain. In practice many articles are used in a combination of strains, such as combined compression and shear. Because of the wide variety of combinations possible in practice no recommended values are given for static strains. However, the recommendations given here can be applied to the dynamic shear component whether or not a static strain is present.

For all test purposes the minimum time between vulcanization and testing shall be 16 h. For non-product tests the maximum time between vulcanization and testing should be 4 weeks and for evaluations intended to be comparable the tests, as far as possible, should be carried out after the same time interval. For product tests, whenever possible the time between vulcanization and testing should not exceed 3 months. In other cases tests should be made within 2 months of the date of receipt by the customer of the product.

Samples and test pieces shall be protected from light as completely as possible during the interval between vulcanization and testing.

Test pieces shall be conditioned for not less than 3 h at 23°±2° C. immediately before testing.

Measurement of test piece dimensions. If the end pieces are bonded to the test rubber during vulcanization, measure their dimensions prior to moulding. This allows the determination of the rubber dimensions from measurements made on the complete moulded test piece.

As an example, for the arrangement shown in FIG. 2, carry out the measurement as follows:
 (a) distances $d_1$, $d_2$ and $d_3$ before moulding,
 (b) distance $d_4$ after moulding,
 (c) calculate the mean thickness of the rubber from $h = \frac{1}{3}[d_4 - (d_1 + d_2 + d_3)]$
 (d) determine the cross-sectional area A from the side length and breadth, or the diameter, measured after moulding.

When the end pieces are bonded to a previously vulcanized rubber test piece, measure the thickness and cross-sectional area before attaching the end pieces.

Take all measurements to a sufficient accuracy to allow determination of the test piece thickness and cross-sectional area to an accuracy of ±1%.

Testing. Testing up to 15 Hz shall be carried out first at the lower strain of ±2%, and the strain should then be increased to ±10%. Because of the hazard of temperature rise, which may be significant at the higher strain at 15 Hz (see Appendix B), the period of oscillation at this strain should be kept to a minimum, consistent with obtaining accurate results. The temperature rise may be a particular problem at low temperatures where the materials are very much stiffer. If time dependent changes occur during the test which can be attributed to a temperature rise, the results should be extrapolated to zero time to obtain the dynamic properties appropriate to the nominal test temperature. At higher frequencies the test amplitude should be lower, as given in table 1. Temperature rise at these higher frequencies is unlikely to be a problem at the amplitudes recommended. It should be noted that the modulus at low deformation is depressed by prior oscillations at higher deformations, some hours of resting being necessary for the effect to disappear. Thus, if tests above 15 Hz are required, it is desirable to begin at the high frequencies (and thus smaller amplitudes) and to reduce the frequency (increasing the amplitude), in order to avoid this possible complication.

It is recommended that the results be presented as the variation of tan δ and |G*| with temperature, frequency and amplitude. Appendix C indicates how these quantities can be determined from a force-deflection curve. If both the force and displacement are sinusoidal with respect to time, the signals from the transducers can be analyzed by suitable electronic techniques to give the required information without recourse to recording the force-deflection loop. However, filled rubbers may exhibit some non-linearity in behaviour which complicates this treatment and measurement of the area of the force-deflection loop as described in Appendix C may be the most realistic procedure.

We have tried using a coil spring in the cutter assembly to try and prevent a substantial transient reduction of the cutting load but surprisingly found that the springs we used had little or no damping influence and were unsuitable. We believe this is because the vast majority of springs used for cutter applications have a small hysteresis and a loss factor tan δ which is very small lying within the range 0 and 0.1. We have also tried blocks of natural rubber and neoprene both of which proved unsuitable for our particular application. We believe the natural rubber damping device has a tan δ lying between 0.1 to 0.15 whilst neoprene has a tan δ of approximately 0.2.

Advantageously, therefore, the loss factor tan δ of our damping device has a loss factor greater than 0.2. In particular we have found that a block of resilient material having a 35% nitrile composition provides a suitable damping device. The loss factor tan δ of such a damping device has been estimated as approximately 0.3.

Preferably the loss factor tan δ of the damping device is more than or equal to 0.3.

We have found that the higher the loss factor tan δ the lower the resilience and the more efficient is the damping device. Blocks of butyl rubber and polyacrylate of inherently high hysteresis loss factors of approximately 0.7 and 0.8 respectively have been found suitable and preferable to blocks of resilient materials having lower loss factors. We believe that damping devices having loss factors higher than 0.8 are also suitable.

Conveniently the damping device comprises a block of resilient material such as for example a rubber or synthetic plastics material or a composite structure of materials having the property of an elastomer with an inherently high hysteresis and high loss factor tan δ. Such materials may be deformed under load and subsequently recover their original form only releasing a part of the original energy input needed for deformation. Preferably the block of resilient material is in the form of a hollow block.

Preferably the damping member is maintained continuously in a state of compression so that the damping member is preloaded for resisting any reduction in the load force of the cutting tool.

A feature of the present invention is that of providing a glass scoring apparatus comprising a cutter assembly having a cutting tool for scoring a glass surface, moving means for moving the cutter assembly relative to the glass surface to be scored and means for applying a load force urging the cutting tool into engagement with the glass surface, and connecting means connecting the cutter assembly to the means for applying a load force, said connecting means including an untensioned damping device located between two parts of the connecting means having a sufficiently high loss factor tan δ to prevent a substantial transient reduction of the cutting load when the cutting tool is moved into contact with the glass surface.

Conveniently the damping device is compressed between the two parts of the connecting means.

The means for moving the cutter assembly towards and away from the glass surface and means for applying the cutting load can for example be an alectromagnetic, pneumatic, fluid or mechanical system, or a combination of such systems. The means we prefer comprises a double acting pneumatic cylinder and piston device. The pneumatic cylinder and piston device may be similar to that described in our British Patent Specification No. 1323097.

Our British Patent Specification No. 1323097 describes and claims glass scoring apparatus having a cutter assembly which can be moved towards and away from a glass surface to be scored by means of a double acting pneumatic cylinder and piston, there being a housing defining the cylinder in which the piston can slide, and a shaft connected with the piston and extending axially of the cylinder through a passageway in a wall of the housing so as to project therefrom, the cutter assembly being connected to the projecting end of the shaft, the relative dimensions of the piston and the cylinder and the relative dimensions of the shaft and the passageway being such as to permit flow of air between the piston and the cylinder wall and between the shaft and the passageway wall, thereby providing two spaced air bearings which facilitate controlled movement of the cutter assembly.

The purpose of allowing air to bleed past the piston and piston rod is to reduce the friction normally associated with a pneumatic cylinder. In order to improve the response time of such an arrangement to allow for scoring operations at speeds greater than 2 meters per second, the piston and cylinder mechanism may be modified to reduce the friction further and decrease the response time of the apparatus.

Preferably, at least two ducts are provided through a wall of the piston head to provide communication between a space defined between the piston head and the cylinder wall and the chamber in the cylinder above the piston head. Preferably the passageway wall is provided with two or more ducts for communication between the outside of the passageway wall and the space between the shaft and the passageway wall.

Conveniently a source of pressurised air can be connected to the or each duct in the passageway wall for maintaining an airflow between the shaft and the passageway wall.

Conveniently a source of pressurised air can be connected to the or each duct in the passageway wall for maintaining an airflow between the shaft and the passageway wall.

A further modification to the apparatus described in our British Patent Specification No. 1323097 comprises mounting the top of the cylinder to a supporting bracket by means of a fulcrum pin located through a self-aligning bearing. A link including a self-aligning bearing may also be attached to the end of the piston rod, the link being attached to the cutter assembly by means of a fulcrum pin through the self-aligning bearing.

The use of self-aligning bearings makes allowance for any misalignment between the cylinder support and cutter assembly and thereby further reduces friction between the piston head and the cylinder wall and between the piston rod and the passageway wall.

BRIEF DESCRIPTION OF THE DRAWINGS

FIG. 1 is a side elevation of a cutting apparatus in accordance with the present invention, FIG. 2 is a section on the line 2—2 in FIG. 1, FIG. 4 is a side elevation of an alternative embodiment of the invention showing a different cutter assembly, and FIG. 5 is a part-sectional elevation of a further alternative cutter assembly which may be used in accordance with the present invention.

DESCRIPTION OF THE PREFERRED EMBODIMENTS

Figure 3:
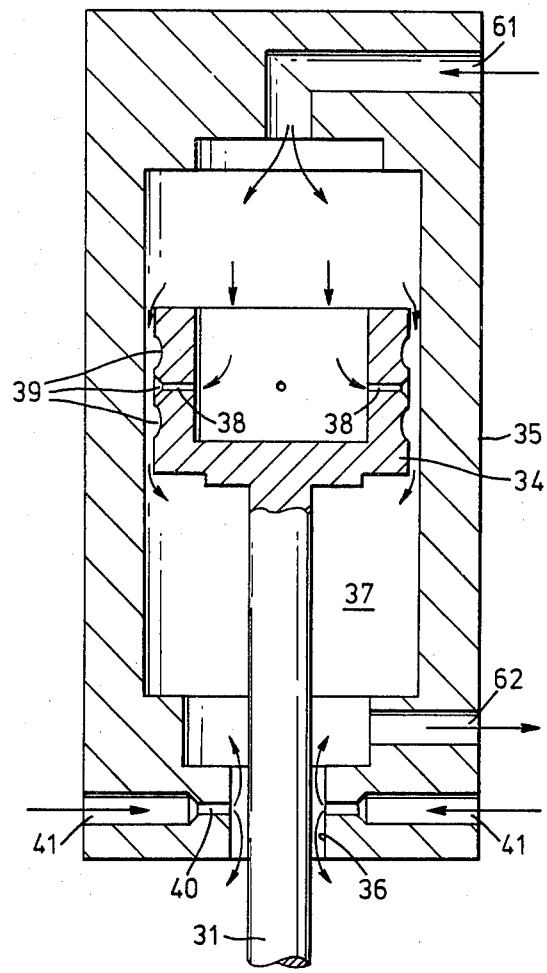
FIG. 3 is a sectional view of a cylinder and piston for use in an apparatus of the type shown in FIGS. 1 and 2, adapted for use at high cutting speeds.

In the arrangement shown in FIG. 1, a cutter assembly 11 is pivotably mounted on a supporting member 60. It is also attached by means of a self-aligning rod end 29 and a fulcrum pin 28 to a piston rod 31, which is part of a pneumatic piston and cylinder device 12. The device 12 is supported from a mounting bracket 13 by a self-aligning bearing 14 and fulcrum pin 14a. The mounting bracket 13 is attached to a support 13a to which the supporting member 60 is also attached by means not shown. The cutter assembly has on its underside a cutting wheel 15 such as a carbide wheel, and this is supported above a glass sheet or ribbon 16 which is to be scored on its upper surface. The pneumatic piston and cylinder device 12, which is generally similar to that described in our British Patent Specification No. 1323097, can be operated to raise or lower the cutter assembly 11 relative to the glass sheet 16 so that the wheel 15 may be moved into contact with the surface of the glass sheet 16 and a suitable load force applied to the cutting wheel to achieve a satisfactory score.

The wheel 15 is rotatably mounted on a carrier 17 which is held by a screw 18 in a downwardly facing recess 19 in a cutter arm 20. The cutter arm has two spaced upstanding lugs 21 and an extension member 22 providing a flat surface supporting the damping member which in this case consists of a resilient block 23. The two lugs 21 are spaced on opposite sides of a generally horizontal arm 24 which is pivotally linked to the lugs 21 by means of a pivot pin 25. The right-hand end of the arm 24 is provided with an adjustable mechanical stop in the form of a screw 16 which passes through the arm 24 and engages at its lower end the upper surface of the member 22. The other end of the arm 24 bears against the upper part of the resilient block 23 and by suitable adjustment of the screw 26, the resilient block 23 can be preloaded to a desired degree of compression. The arm 24 has at its left hand end two lugs 27 which have a space between them into which the rod end 29 is located and held by means of a fulcrum pin 28. The rod end 29 is threaded (female) to mate with the end of piston rod 31 (threaded male) to allow for adjustment of the piston position in the cylinder relative to the cutter assembly. A nut 30 is used to lock the piston rod 31 to the rod end 29 after adjustment.

In this example, the resilient block 23 comprises a hollow block of polyacrylate which has a loss factor tan $\delta$ of approximately 0.8 or above. The polyacrylate has an International Rubber Hardness (IRH) of 50. Materials with higher or lower IRH values than 50 can be used, 50 being a typical example. The polyacrylate has the advantage of having stable damping characteristics i.e., the percentage of energy absorbed during each cutting or scoring action should be the same. Other usable materials may, for example, comprise some rubbers, polyurethane or a cellular form of either rubber or plastics material or a combination of such materials. Preferably all such materials should have stable damping characteristics. Another type of material which can be used is butyl rubber which has a loss factor tan $\delta$ of approximately 0.7. The block has a hole in its centre to allow a greater degree of flexing and it is held continuously under a controlled amount of compression between the arm 24 and the surface of the member 22. The amount of compression is controlled by the stop 26.

In use, the glass to be scored is normally supported on a cutting bed, typically a section of a roller conveyor. In order to prevent the cutting wheel hitting the conveyor rollers, an adjustable stop 32 (FIG. 2) is provided and arranged to cooperate with a projection 33 on the cutter assembly so as to ensure that the cutting wheel never falls below a level of for example, 1 mm above the level of the cutting bed. Also the stop 32 ensures that the piston does not "bottom" in the cylinder when the cutting arm is in its lowest position.

The piston and cylinder device 12 shown in FIGS. 1 and 2 is operated in a manner similar to that described in our British Patent Specification No. 1323097. However, additional passages are provided to improve operation of the two air spaced bearings in the piston and cylinder device. A preferred arrangement for use in cutting at high speeds is shown in more detail in FIG. 3. Similar reference numerals have been used in FIGS. 1 and 2 for corresponding parts. The arrangement comprises a piston 34 connected to the shaft 31. The piston is surrounded by a cylinder 35. One air bearing is provided between the piston 34 and the surrounding wall of the cylinder 35. A second air bearing is provided between the shaft 31 and the surrounding wall 36 at the lower end of the piston. In order to avoid depletion of air from these bearings when depressurisation occurs in the chamber 37 below the piston, additional ducts are provided adjacent to both air bearings. Four equally spaced ducts 38 are provided through the wall of the piston head thereby allowing air above the piston to flow through the ducts into spaces 39 between the wall of the piston and the wall of the cylinder. Similarly four equally spaced ducts 40 are provided through the wall 36 at the lower end of the cylinder where it surrounds the shaft 31. The ducts 40 lead to air supply passages 41 which may be connected to a high pressure air source. Air then flows to the air bearing as indicated by the arrows in FIG. 3. In operation a constant cutting load pressure is applied through duct 61 to the chamber above the piston. The pressurisation and depressurisation of the chamber below the piston head being controlled by a pressure controlling means connected to a duct 62.

In use, the cutter assembly is moved to a suitable position for commencing a score line. Subsequent relative movement between the cutting wheel and the glass surface may be effected by moving the glass relative to the cutter or in some cases it may be preferable to move the cutting apparatus while the glass is held stationary. Normally, however, the glass and cutter are moved relative to one another such that bidirectional movement takes place so as to produce the required score line. When the cutting wheel has passed the edge of the glass, the cutter assembly is forced downwards by movement of the piston shaft 31 under the influence of pneumatic pressure acting above the piston head 34 so that the wheel is forced into contact with the glass surface and a suitable load force is applied to effect satisfactory scoring of the glass surface. As the cutting wheel engages the glass surface, the impact creates a reaction from the glass and its supporting cutting bed tending to cause the wheel and cutter assembly to rebound away from the glass surface. The travel of the piston rod 31 is preferably arranged such that when the wheel first engages the glass surface the piston still has a small downward stroke for example of the order of 5 mm. Consequently, at the time the cutting wheel receives a reaction force from the glass surface tending to cause it to rebound, the piston is still travelling in a downward direction. However, the connecting mechanism between the cutting wheel 15 and the piston shaft 31 is arranged to absorb energy from the reaction force of the glass surface and to maintain the cutting wheel 15 in contact with the glass surface with sufficient load force to achieve satisfactory scoring. The upwards force on the wheel 15 is transmitted to the damping block 23 which absorbs some of the energy and continues to exert a force between the arm 24 and extension 22 tending to maintain the cutting wheel in engagement with the glass surface.

In order to achieve the best results, the cutter assembly is made of low density materials so as to reduce the overall mass of the cutter assembly.

In typical operation conditions, the cutting load applied to the cutting wheel 15 may be between 3 and 4 kgs.

The invention is not limited to the details of the foregoing examples. For example, FIG. 4 shows an alternative cutter assembly and like parts have been marked with the same reference numerals as used in FIGS. 1 and 2. In this particular example, the arm 20 of the cutter assembly has a shoe 50 which provides the lower support surface for the resilient block 23. In place of the adjustable stop 26, a solid block of material 51 is used as a spacer between the arm 24 and the shoe 50 thereby providing the required compressive preload to the block 23.

FIG. 5 shows a further alternative cutter assembly. In this arrangement, the cutter assembly 11 is connected to the shaft 31 by means of a linear lost motion connection rather than the pivoted arm connection mechanism described in the earlier examples. The cutter arm 20 is provided with lugs 21 which fit on opposite sides of a block 53 attached to the lower end of the shaft 31. The block 53 is provided with an elongated slot 54 and the lugs 21 are connected to the block 53 by means of a pin 55 passing through the elongated slot 54. The lower end of the block 53 bears against the upper surface of the resilient damping block 23. It will be seen that when the shaft 31 is moved in a vertical direction, the cutter assembly will normally move with it. However, the location of the pin 55 in the elongated slot 54 permits compression of the block 23 to absorb energy from reactive forces on the cutting wheel 15 when the wheel is urged upwardly by the glass surface against the downward loading force applied by the shaft 31.

It is to be understood that our invention can also be used for different cutting operations to the one described above in which problems of "stitching" and poor scoring can occur. The cutting of a glass ribbon or a glass sheet having saleable edges (i.e., from which the selvedge has been removed) involves charging the cutting tool transversely into the edge of the glass ribbon or glass sheet and then transversely over the surface of the glass ribbon or glass sheet. The initial impact between the tool and the edge of the glass can cause "stitching" and prior scoring and by employing a glass scoring apparatus having a damping device according to our invention these problems can be reduced or substantially eliminated.

We believe that our invention has advantages even when low cutting speeds are used in that the presence of a damping member helps to increase the useful life of the cutting tool, and thereby substantially reduces glass loss because of the reduced number of changes of cutting tool required over a period of time.

We claim:

1. Glass scoring apparatus comprising a cutter assembly for carrying a cutting tool, means connected to the cutter assembly for transmitting a cutting load to the cutter assembly, and a block of resilient material for absorbing part of any energy developed by reaction forces opposing the cutting load when the cutting tool is moved into contact with the glass surface, block of resilient material having a loss factor tan $\delta$ which is greater than 0.2 as determined by British Standard BS903; Part A24 1976 at a temperature of 23° C. and a frequency of 200 Hertz, so as to prevent a substantial transient reduction in the cutting load.

2. Glass scoring apparatus comprising a cutter assembly having a cutting tool for scoring a glass surface, moving means for moving the cutter assembly relative to the glass surface to be scored and means for applying a load force urging the cutting tool into engagement with the glass surface, and connecting means connecting the cutter assembly to the means for applying a load force, said connecting means including an untensioned block of resilient material located between two parts of the connecting means, the block of resilient material having a loss factor tan $\delta$ which is greater than 0.2 as determined by British Standard BS903; Part A24; 1976 at a temperature of 23° C. and a frequency of 200 Hertz, so as to prevent a substantial transient reduction in cutting load when the cutting tool is moved into contact with the glass surface.

3. Glass scoring apparatus according to claim 1 or claim 2 in which the resilient material comprises a block of polyacrylate.

4. Glass scoring apparatus according to claim 1 or claim 2 in which the block of resilient material has a loss factor of at least 0.3.

5. Glass scoring apparatus according to claim 1 in which the block comprises a hollow block.

6. Glass scoring apparatus according to claim 1 or claim 2 in which the resilient material comprises a block of butyl rubber.

7. Glass scoring apparatus according to claim 1 or claim 2 in which the damping member is maintained in a state of compression and thereby preloaded.

8. Glass scoring apparatus according to claim 2 in which the means for moving the cutter assembly towards and away from the glass surface comprises a double acting pneumatic piston and cylinder device.

9. Glass scoring apparatus according to claim 1 in which the block of resilient material is compressed between two arms pivotally connected to each other, one of the arms being connected to the cutting tool and the other arm connected to the means for applying the cutting load, adjustment means being provided to vary the separation of the arms and thereby the state of compression of the block.

10. Glass scoring apparatus as claimed in claim 1 in which a lost motion connection is provided between the means for applying the cutting load and the cutting tool, said lost motion connection including said block of resilient material.

11. Glass scoring apparatus comprising a cutter assembly having a cutting tool for scoring a glass surface, a piston and cylinder device for moving the cutter assembly towards and away from the glass surface and applying a load force urging the cutting tool into engagement with the glass surface, and connecting means connecting the cutter assembly to the piston and cylinder device, said connecting means including a damping device comprising a compressed block of resilient material, the block of resilient material having a loss factor tan $\delta$ as herein defined which is greater than 0.2 as determined by British Standard BS903; Part A24 1976 at a temperature of 23° C. and a frequency of 200 Hertz, so as to prevent a substantial transient reduction in cutting load when the cutting tool is moved into engagement with the surface.

12. Glass scoring apparatus according to claim 11 wherein the damping device is such that when subjected to strain, the resilient material exhibits stress in phase with the strain and stress out of phase with the strain, the ratio of out of phase stress to in phase stress being greater than 1 to 5.

* * * * *